US012294809B1

(12) United States Patent
Cao et al.

(10) Patent No.: US 12,294,809 B1
(45) Date of Patent: May 6, 2025

(54) AI-POWERED CLOUD-NATIVE NETWORK VIDEO RECORDER (NVR)

(71) Applicant: AGI7 Inc., San Jose, CA (US)

(72) Inventors: Song Cao, San Jose, CA (US); Tianhu Yang, San Jose, CA (US)

(73) Assignee: AGI7 Inc., San Jose, CA (US)

( * ) Notice: Subject to any disclaimer, the term of this patent is extended or adjusted under 35 U.S.C. 154(b) by 0 days.

(21) Appl. No.: 18/628,532

(22) Filed: Apr. 5, 2024

(51) Int. Cl.
| | |
|---|---|
| *H04N 5/77* | (2006.01) |
| *G06V 10/70* | (2022.01) |
| *G06V 20/40* | (2022.01) |
| *G06V 20/52* | (2022.01) |
| *G11B 27/031* | (2006.01) |
| *H04N 5/91* | (2006.01) |
| *H04N 7/18* | (2006.01) |
| *H04N 19/40* | (2014.01) |

(52) U.S. Cl.
CPC ............... *H04N 5/77* (2013.01); *G06V 10/70* (2022.01); *G06V 20/44* (2022.01); *G06V 20/52* (2022.01); *G11B 27/031* (2013.01); *H04N 5/91* (2013.01); *H04N 7/181* (2013.01); *H04N 19/40* (2014.11)

(58) Field of Classification Search
None
See application file for complete search history.

(56) References Cited

U.S. PATENT DOCUMENTS

| | | | | |
|---|---|---|---|---|
| 10,289,917 | B1* | 5/2019 | Fu | G08B 13/19602 |
| 10,855,920 | B1* | 12/2020 | Shih | G06F 1/266 |
| 11,158,177 | B1* | 10/2021 | ElHattab | G08B 13/19682 |
| 11,765,324 | B1* | 9/2023 | Fu | H04N 23/661 |
| | | | | 348/143 |
| 2017/0098126 | A1* | 4/2017 | Laska | G11B 27/028 |
| 2018/0260630 | A1* | 9/2018 | Cao | G06V 10/764 |
| 2019/0258864 | A1* | 8/2019 | Lee | G06T 11/206 |
| 2020/0099896 | A1* | 3/2020 | Galvin | G01D 3/022 |
| 2022/0059132 | A1* | 2/2022 | Sun | G11B 27/28 |
| 2022/0335806 | A1* | 10/2022 | Dice | G06V 20/52 |
| 2023/0370710 | A1* | 11/2023 | Xiong | H04N 23/631 |
| 2024/0007744 | A1* | 1/2024 | Muthiah | H04N 23/90 |
| 2024/0096085 | A1* | 3/2024 | Walawalkar | G06N 20/00 |

* cited by examiner

Primary Examiner — Gelek W Topgyal

(57) ABSTRACT

This application describes an AI-powered Cloud-native Network Video Recorder (NVR) apparatus. This apparatus features multiple Power over Ethernet (PoE) ports, processors, computer-readable memories, and firmware implementing a camera-integration module, an Artificial Intelligence (AI) module, and a cloud-access module. The camera-integration module enables efficient connection and video data reception from heterogeneous cameras. The AI module processes the video data, identifying and generating clips of interest, optimizing surveillance efficiency. Finally, the cloud-access module facilitates the uploading of these clips to cloud storage, ensuring accessible and secure data management. This innovative NVR apparatus enables users to deploy a cloud-native video surveillance system using existing camera devices, significantly lowering the cost of adoption.

17 Claims, 10 Drawing Sheets

500

---

Integrate a plurality of cameras through a plurality of Power over Ethernet (PoE) ports of the NVR

510

---

Simultaneously receive video data from the plurality of cameras

520

---

Feed the received video data into a plurality of pruned machine learning models to identify video clips of interest, where the plurality of pruned machine learning models are pruned by decomposing a structure of the machine learning models into a plurality of matrices and compressing the plurality of matrices

530

---

Upload the video clips of interest to a cloud server for storage and sharing, wherein the uploading comprises: uploading, at a first timepoint, a lower-resolution version of the video clips of interest to the cloud server for immediate cloud access, and uploading, at a second timepoint later than the first timepoint, a higher-resolution version of the video clips of interest to the cloud server to replace the lower-resolution version of the video clips of interest

AI-POWERED CLOUD-NATIVE NETWORK VIDEO RECORDER (NVR)

TECHNICAL FIELD

The disclosure relates generally to the field of surveillance systems and, more specifically, to a Network Video Recorder (NVR) device designed to operate with a variety of IP cameras and integrate AI (Artificial Intelligence)-powered video processing with cloud storage capabilities.

BACKGROUND

Traditional surveillance systems are often limited by the compatibility of their components, especially when it comes to Network Video Recorders (NVRs) and the cameras they support. Conventional NVRs typically store video footage locally, either on built-in hard drives or connected Network Attached Storage (NAS) devices. While local storage offers certain advantages, it presents challenges in terms of scalability, flexibility in access, and susceptibility to data loss. Moreover, many existing NVR systems are constrained to work with IP cameras from the same manufacturer due to proprietary communication protocols, thus limiting the versatility of such systems and increasing costs for users who wish to upgrade or expand their surveillance systems. This manufacturer lock-in can lead to a significant investment in new hardware when scaling or updating the system.

Additionally, these systems often feature processors with limited capabilities, restricting the NVR's ability to perform computationally intensive tasks such as video compression, frame rate management, or advanced video analytics. This limitation becomes particularly pronounced when considering the increased demand for intelligent video analysis, which requires substantial processing power for real-time data interpretation.

Recent advancements have seen some NVR-based surveillance systems transition towards cloud-based video storage, with IP cameras uploading footage directly to cloud services. While this approach mitigates some of the issues related to local storage, it introduces the requirement for high-end, cloud-compatible IP cameras, representing a barrier to entry for users with existing camera infrastructure. The direct upload of video to cloud storage often entails a significant increase in bandwidth usage and lacks the nuanced control over what video data is ultimately stored or analyzed.

In light of these challenges, there is a need for an improved NVR system that offers compatibility across different IP camera manufacturers, utilizes AI-powered video processing to optimize bandwidth and storage, and seamlessly integrates with cloud storage solutions. Such a system would benefit users by offering a cost-effective, scalable, and flexible surveillance solution capable of supporting the sophisticated video analytics required in today's security landscape.

SUMMARY

Various embodiments of this specification may include apparatuses, systems, and hardware circuits to overcome the limitations of the existing NVR-based surveillance systems by providing a novel NVR design that incorporates universal camera-integration capabilities, an intelligent video processing module, and direct cloud access. This novel approach not only enables the use of existing IP camera setups without necessitating costly replacements but also leverages advanced AI-driven video analysis at the NVR level. By doing so, the system ensures that only pertinent video clips are processed and stored, thereby optimizing cloud storage utilization and enabling more efficient bandwidth management. Additionally, by offering remote access to video data via cloud storage, the proposed NVR system significantly enhances user convenience and data security, marking a significant advancement in the field of surveillance systems.

In some aspects, the techniques described herein relate to Network Video Recorder (NVR) device. An example NVR may include a plurality of Power over Ethernet (PoE) ports. The NVR may also include one or more processors and one or more non-transitory computer-readable memories coupled to processor. The NVR may furthermore include a camera-integration module, an Artificial Intelligence (AI) module, and a cloud-access module deployed in the one or more non-transitory computer-readable memories and executable by the processor. The NVR may additionally include the camera-integration module configured to connect a plurality of cameras to the NVR through the plurality of PoE ports and receive video data collected by the plurality of cameras. The NVR may further include the AI module configured to process the video data and generate video clips of interest. The NVR may also include the cloud-access module configured to upload the video clips of interest to a cloud storage. Other embodiments of this aspect include corresponding computer systems, apparatus, and computer programs recorded on one or more computer storage devices, each configured to perform the actions of the methods.

In some embodiments, the camera-integration module is manufacturer agnostic, and the plurality of cameras may include a plurality of Internet Protocol (IP) cameras from different manufacturers. The camera-integration module may include: a pool of communication protocols respectively corresponding to a plurality of camera manufacturers, where the camera-integration module is further configured to: activate, from the pool of communication protocols, a communication protocol corresponding to a camera manufacturer for connecting to a camera from the camera manufacturer, where the activated communication protocol is configured to receive the video data from the camera. The camera-integration module may include: a video codec sub-module for transcoding the video data of different formats from the plurality of cameras into a standard video format.

In some embodiments, the AI module may include: one or more trained and pruned machine learning models configured to perform one or more of the following operations: motion detection; objection detection; objection recognition; facial recognition; license plate recognition; object attribute analytics; heat mapping; or human activity recognition. The AI module is configured to perform object detection on video feeds from more than ten IP cameras at more than twenty frames per second.

In some embodiments, the NVR may include: a graphic user interface configured for an user to select video attributes defining the video clips of interest, where: the AI module is further configured to detect video clips satisfying the selected video attributes. The graphic user interface is further configured for the user to select one or more workflows that are triggered when an event of interest when detected in the video data. The one or more workflows may include one or more of (1) automatic recording in response to the event of interest when detected, (2) alert forwarding, (3) operating an access barrier, or (4) playing a preconfigured audio.

In some embodiments, the graphic user interface is further configured to: receive user credentials for accessing the cloud storage. The graphic user interface is further configured to: receive user instructions assigning different priorities to the video attributes defining the video clips of interest.

In some embodiments, the NVR may include: a local video staging storage for temporarily storing the video clips of interest before uploading to the cloud storage, where the cloud-access module is configured to: arrange the video clips of interest in the local video staging storage according to the different priorities assigned to the video attributes associated with the video clips of interest; and upload the arranged video clips of interest from the local video staging storage.

In some embodiments, the cloud-access module may include: a video compression sub-module for compressing the video clips of interest before uploading the video clips. The cloud-access module may include: an encryption sub-module configured to encrypt the video clips of interest before uploading to the cloud storage. The cloud-access module is further configured to upload a video clip of interest using a dynamic streaming policy to mitigate bandwidth congestion, characterized by: uploading, at a first time point, a lower-resolution version of the video clip of interest to the cloud storage for immediate cloud access, and uploading, at a second time point later than the first time point, a higher-resolution version of the video clip of interest to the cloud storage to replace the lower-resolution version of the video clip of interest. The cloud storage allows a first user to share a video clip with a second user.

In some embodiments, the NVR may include: a primary local storage configured to store the video data, and an archive storage configured to store highly compressed video data, where the video data older than a preset duration in the primary local storage is compressed and migrated to the archive storage. The plurality of cameras are directly powered through the plurality of PoE ports. The AI module may include a neural network or a deep neural network. The video data may include a plurality of video feeds collected by the plurality of cameras, and the AI module is further configured to: for each of the plurality of video feeds, inputting the video feed into a plurality of trained and pruned machine learning models in parallel for generating the video clips of interest. Implementations of the described techniques may include hardware, a method or process, or a computer tangible medium.

In another general aspect, a computer-implemented method may be performed by the above-described NVR device. The method may include connecting to a plurality of cameras through a plurality of Power over Ethernet (PoE) ports of the NVR. The method may also include simultaneously receiving video data from the plurality of cameras. The method may furthermore include feeding the received video data into a plurality of pruned machine learning models to identify video clips of interest, where the plurality of pruned machine learning models are pruned by decomposing a structure of the machine learning models into a plurality of matrices and compressing the plurality of matrices. The method may in addition include uploading the video clips of interest to a cloud server for storage and sharing, where the uploading may include: uploading, at a first time point, a lower-resolution version of the video clips of interest to the cloud server for immediate cloud access, and uploading, at a second time point later than the first time point, a higher-resolution version of the video clips of interest to the cloud server to replace the lower-resolution version of the video clips of interest. Other embodiments of this aspect include corresponding computer systems, apparatus, and computer programs recorded on one or more computer storage devices, each configured to perform the actions of the method.

These and other features of the systems, methods, and hardware devices disclosed, and the methods of operation and functions of the related elements of structure and the combination of parts and economics of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 5 illustrates an example method performed by an AI-powered cloud-native NVR, in accordance with some embodiments.

DETAILED DESCRIPTION

The specification is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

An NVR (Network Video Recorder) is a pivotal element in contemporary surveillance systems, designed to interface seamlessly with IP (Internet Protocol) cameras. Unlike DVRs (Digital Video Recorders), which are tailored for analog cameras, NVRs capture and preserve video content from networked cameras over an IP network.

NVRs are crucial in settings that demand robust, high-fidelity surveillance, such as commercial sites, industrial complexes, educational institutions, and residential areas where security is crucial. They offer a scalable and reliable solution capable of delivering high-resolution video feeds, essential for effective monitoring of expansive spaces. The implementation of Power over Ethernet (PoE) streamlines camera installation by facilitating power delivery directly through network cabling, thus allowing cameras to operate independently of direct power source availability.

This disclosure focuses on NVR systems for scenarios requiring expansive coverage and the management of numerous cameras, ensuring high-quality surveillance without degradation of video fidelity. These systems are equipped to manage a substantial amount of high-resolution video data, offering extensive storage capabilities. They support a multitude of cameras, including those from various manufacturers, as long as they comply with standard IP protocols. Contrastingly, WiFi camera systems are typically preferred for their user-friendly setup, catering to home and small business users who may prioritize convenience and ease of use over the expansive, integrated capabilities of NVR systems.

A person having ordinary skill in the art would recognize that WiFi camera systems and NVR systems are engineered to address distinct technical challenges and operational environments. Given their divergent design principles, functionalities, and intended applications of these different types of systems, it would not be obvious to one skilled in the art to apply teachings or solutions from WiFi camera systems directly to NVR systems without inventive effort.

Figure 1A:
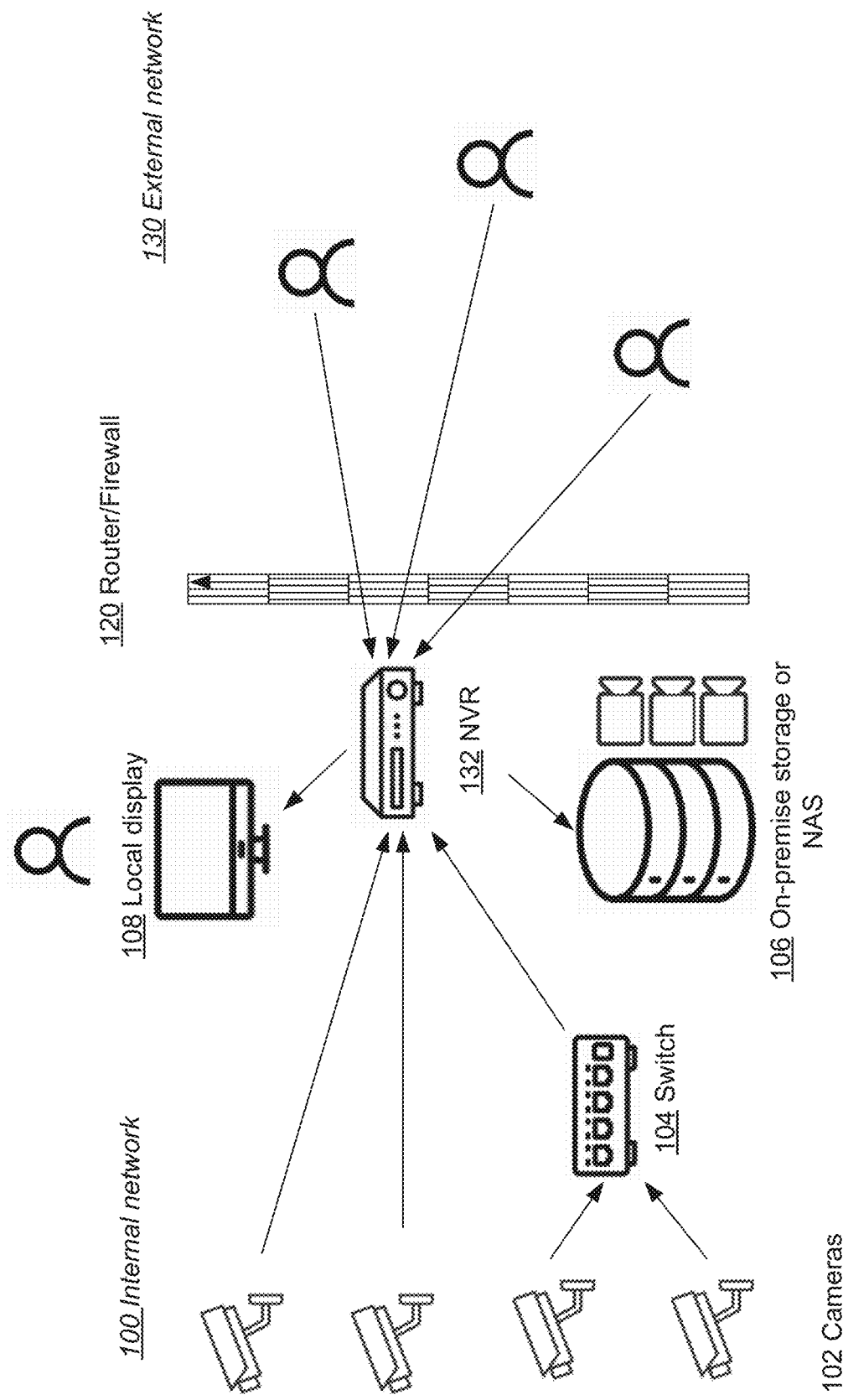
FIG. 1A illustrates a first type of existing NVR-based surveillance system.
Figure 1B:
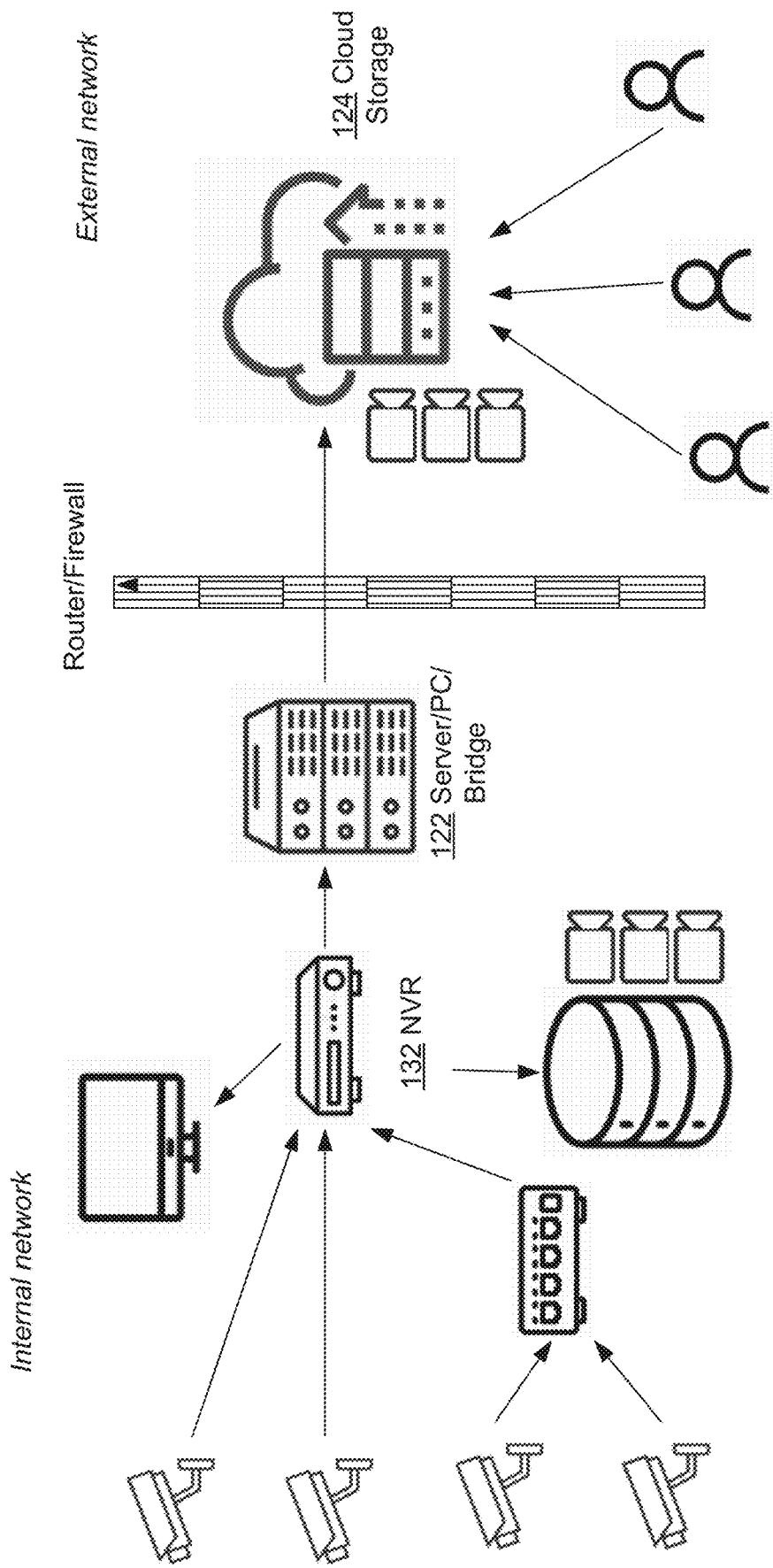
FIG. 1B illustrates a second type of existing NVR-based surveillance system.
Figure 1C:
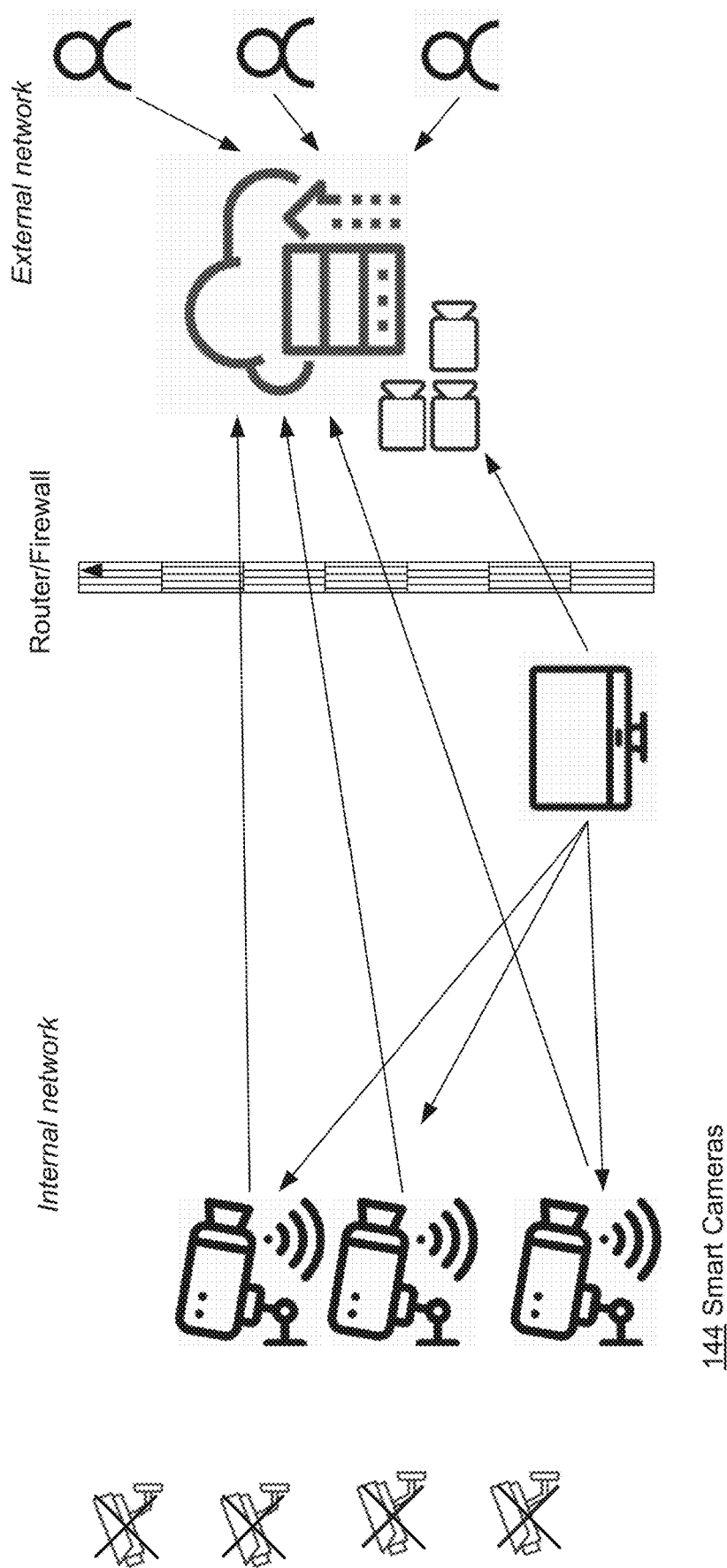
FIG. 1C illustrates a third type of existing NVR-based surveillance system.

In order to explain the innovative aspects of the NVR being described in this disclosure, FIGS. 1A-1C first illustrate the existing NVR-based surveillance systems, detailing their limitations and challenges.

FIG. 1A illustrates a first type of existing NVR-based surveillance system. As shown in FIG. 1A, a plurality of cameras 102 are connected to an NVR 132 in the internal network (e.g., same LAN). The connection may be direct connection or through a switch 104. The NVR 132 receives video feeds from these cameras 102 and stores the videos locally using built-in HDD or SDD, on-premise storage, or Network Attached Storage (NAS) 106. The NVR 132 may also connect to a local display 108 for a local user to access the locally storage videos.

A significant challenge presented by this configuration is scalability. For instance, the NVR 132 has limited capacity for local storage expansion, whether through the acquisition of additional NVRs, external storage units, or supplementary NAS systems. Despite potential storage on a NAS, access restrictions typically confine data retrieval within the network or necessitate complex remote access setups. Moreover, local storage is vulnerable to data loss. Another constraint involves compatibility, with the NVR 132 generally only supporting IP cameras from the same brand. This necessitates replacing any third-party cameras with those compatible with the NVR 132 to deploy a comprehensive surveillance system, escalating adoption costs.

Compounding these issues, the hardware within existing NVRs 132 often comprises basic processing chips with insufficient computational power for tasks such as video compression, quality management, and frame rate adjustments, limiting the NVR's ability to handle complex functions required by contemporary surveillance needs.

A more advanced version of the NVR 132 may have built-in network capabilities, allowing remote users from an external network 130 to access the NVR through a router/firewall 120 and view the locally stored videos. In particular, the remote users need to go through the NVR or go through the user interface provided by the NVR in order to access the locally stored videos, and the user requested data (videos) need to go through the NVR in order to display to the user. In this case, the NVR 132's role as the principal manager of local video content needs to support both local and remote users interface with the NVR. This centralized access model positions the NVR as both a potential single point of failure and a performance bottleneck during surge-access times.

FIG. 1B illustrates a second type of existing NVR-based surveillance system. To address the limitations and challenges of the first type of existing NVR system illustrated in FIG. 1A, the setup in FIG. 1B introduces a cloud storage 124 for storing the video feeds. The cloud-based storage solution in FIG. 1B surpasses the traditional NVR and NAS systems (FIG. 1A) in flexibility, scalability, and access, offering unparalleled advantages for modern businesses, especially those with remote operations. Unlike physically limited NAS devices requiring on-site maintenance, cloud storage is globally accessible, easily scalable without immediate hardware investments, and managed by providers, significantly offloading the IT burden. It boasts superior data redundancy and disaster recovery across multiple locations, minimizing data loss risks and providing robust security features that exceed those typically available in NAS setups. Furthermore, cloud services enhance collaboration by enabling real-time file sharing and editing, making it an ideal choice for dynamic organizations seeking efficient data management and swift adaptability to evolving storage needs.

As shown, in order to access the cloud storage 124, the NVR 132 in FIG. 1B needs an additional server (e.g., in the form of a personal computer (PC) or a or bridge device) 122. The server/bridge device 122 is dedicated to managing cloud-based tasks, such as uploading videos to the cloud for storage, sharing, and other cloud-related functionalities. This setup is often employed to augment the capabilities of the NVR system, which might not inherently possess the necessary software or hardware to efficiently handle cloud integration and management due to its primary focus on local video recording and storage.

The need for the additional server or bridge device 122 arises from limitations in the NVR 132's processing power, storage capacity, or software capabilities, which might not support direct cloud integration or sophisticated data management tasks. By offloading these functions to a dedicated server, the system gains enhanced flexibility, making it possible to leverage the scalability and accessibility of cloud storage without replacing existing NVR hardware.

However, the disadvantages of such architecture are obvious. For example, adding another component, i.e., the server or bridge device 122, to the surveillance infrastructure complicates the system setup and configuration. It requires careful integration to ensure compatibility between the NVR 132, the server 122, and the cloud platform 124, which can demand specialized IT expertise. As another example, beyond the initial investment in hardware and software, there are ongoing costs associated with operating an additional server 122, including power consumption, cooling, maintenance, and potentially software licensing fees. These costs can significantly impact the total cost of ownership.

Furthermore, adding the server does not solve the other limitations of the NVR 132 illustrated in FIG. 1A, e.g., incapable of working with various third-party IP cameras.

FIG. 1C illustrates a third type of existing NVR-based surveillance system.

Industry stakeholders recognize the challenges associated with integrating an additional server (122 as depicted in FIG. 1B) into NVR-based surveillance systems. In response, some of the more advanced systems now feature more powerful IP cameras 114 with enhanced capabilities, allowing for direct cloud uploads and eliminating the need for the server or even the local NVR. These cameras may also have the ability to locally process, crop, or compress video footage (akin to edge computing) prior to cloud storage. A local user has the options to access the video data directly from the smart cameras 144 or from the cloud storage. However, such functionality requires sophisticated, high-end IP cameras 114, leading to a significant financial barrier for establishments looking to upgrade their existing systems. Consequently, entities with established IP camera networks may find the cost of transitioning to cloud-enabled models prohibitively expensive, complicating the adoption of cloud-based surveillance enhancements.

Figure 2:
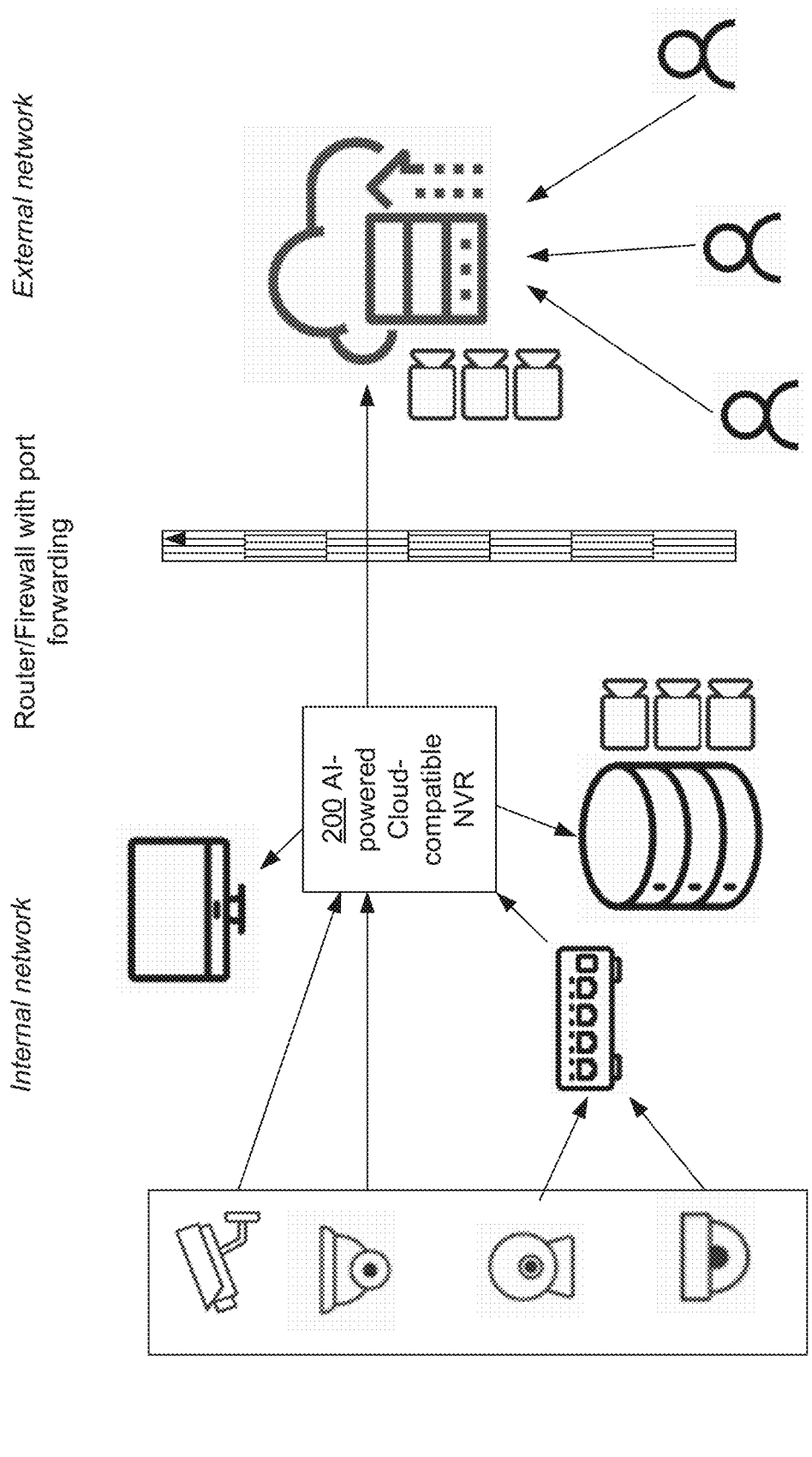
FIG. 2 illustrates a video surveillance system adopting an AI-powered cloud-native NVR device, in accordance with some embodiments.

FIG. 2 illustrates a video surveillance system adopting an AI-powered cloud-native NVR device, in accordance with some embodiments.

In view of the technical limitations and challenges in the existing NVR systems illustrated in FIGS. 1A-1C, a better solution would involve an NVR device that is (1) IP-camera-manufacturer-agnostic, meaning it can work with any existing IP cameras, (2) equipped with AI processing capabilities to handle video data effectively at the NVR, and (3) able to provide direct access to cloud storage. These features would significantly simplify the deployment process in existing infrastructures. This would enable users to effortlessly access, share, and collaborate on video content from any location with an internet connection, offering a much more flexible and user-friendly solution. In FIG. 2, the AI-powered cloud-native NVR 200 may implement at least the above-mentioned three key features in a firmware on an Application-Specific Integrated Circuit (ASIC).

Firstly, the universal compatibility of this NVR 200 with existing IP cameras, regardless of the manufacturer, marks a pivotal shift towards inclusivity and cost effectiveness. By eliminating the need to replace existing cameras with more expensive models, organizations can leverage their current infrastructure, making the transition to enhanced surveillance capabilities both seamless and financially viable. This feature democratizes access to advanced surveillance technologies, allowing a broader range of buildings and companies to upgrade their security systems without the prohibitive costs of hardware replacement.

Secondly, the incorporation of AI processing power within the NVR 200 transforms it into a dynamic, intelligent hub for video analysis. This capability enables sophisticated processing tasks such as real-time video analytics, object detection, and automated alerting based on specific criteria. By processing videos locally before uploading them to the cloud, it optimizes bandwidth usage and ensures that only relevant video clips are stored or reviewed, significantly enhancing efficiency and reducing storage costs.

Thirdly, direct cloud access from the NVR 200 facilitates unprecedented flexibility in video management and access. Users can easily retrieve and view video footage from any location with an internet connection, breaking the constraints of traditional, locally-bound NVR systems. This cloud integration not only simplifies remote monitoring and control but also reduces data redundancy and improves disaster recovery capabilities, ensuring that critical footage is safeguarded against local hardware failures.

Figure 3:
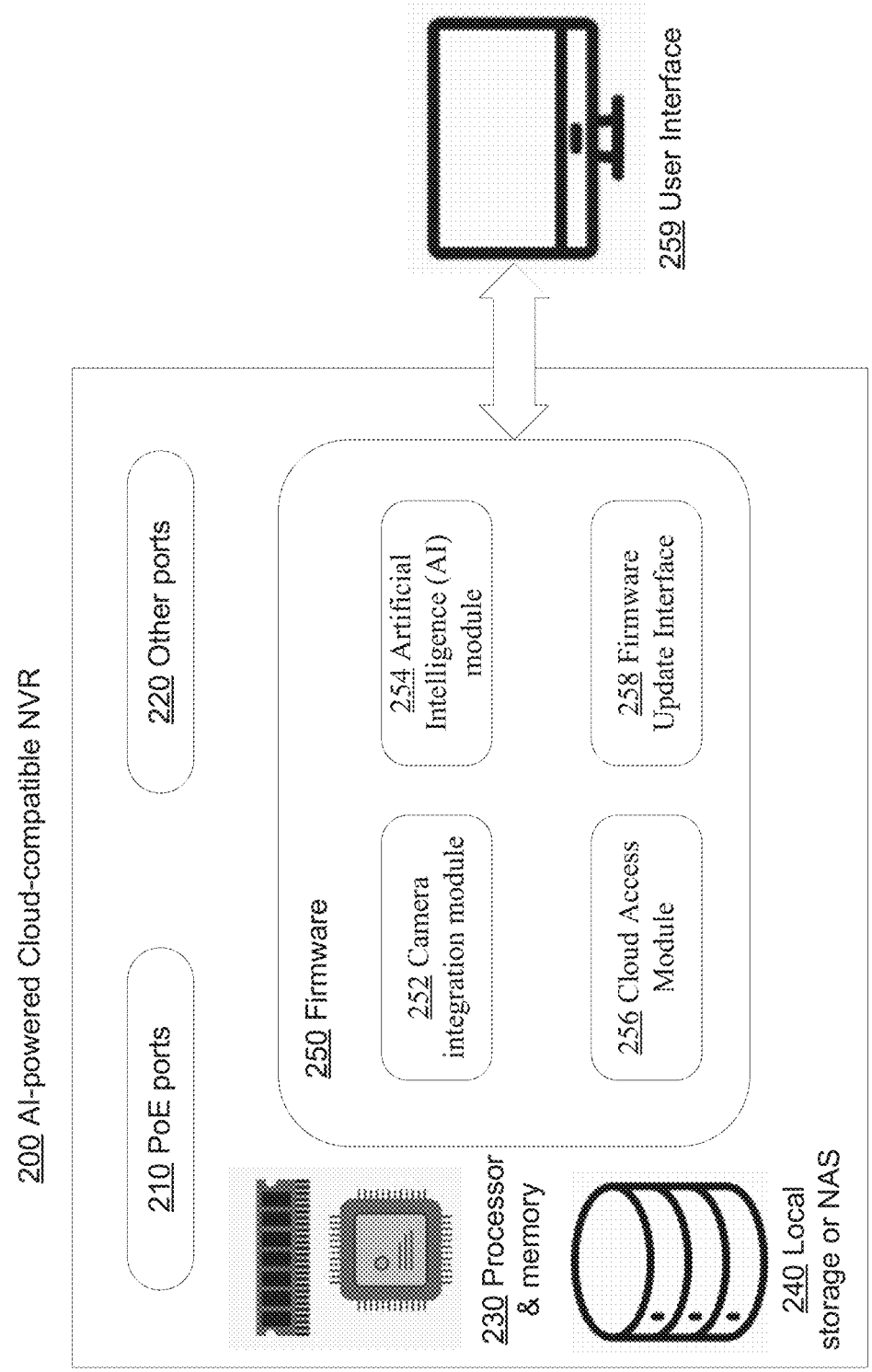
FIG. 3 illustrates an example diagram of the AI-powered cloud-native NVR device, in accordance with some embodiments.
Figure 4A:
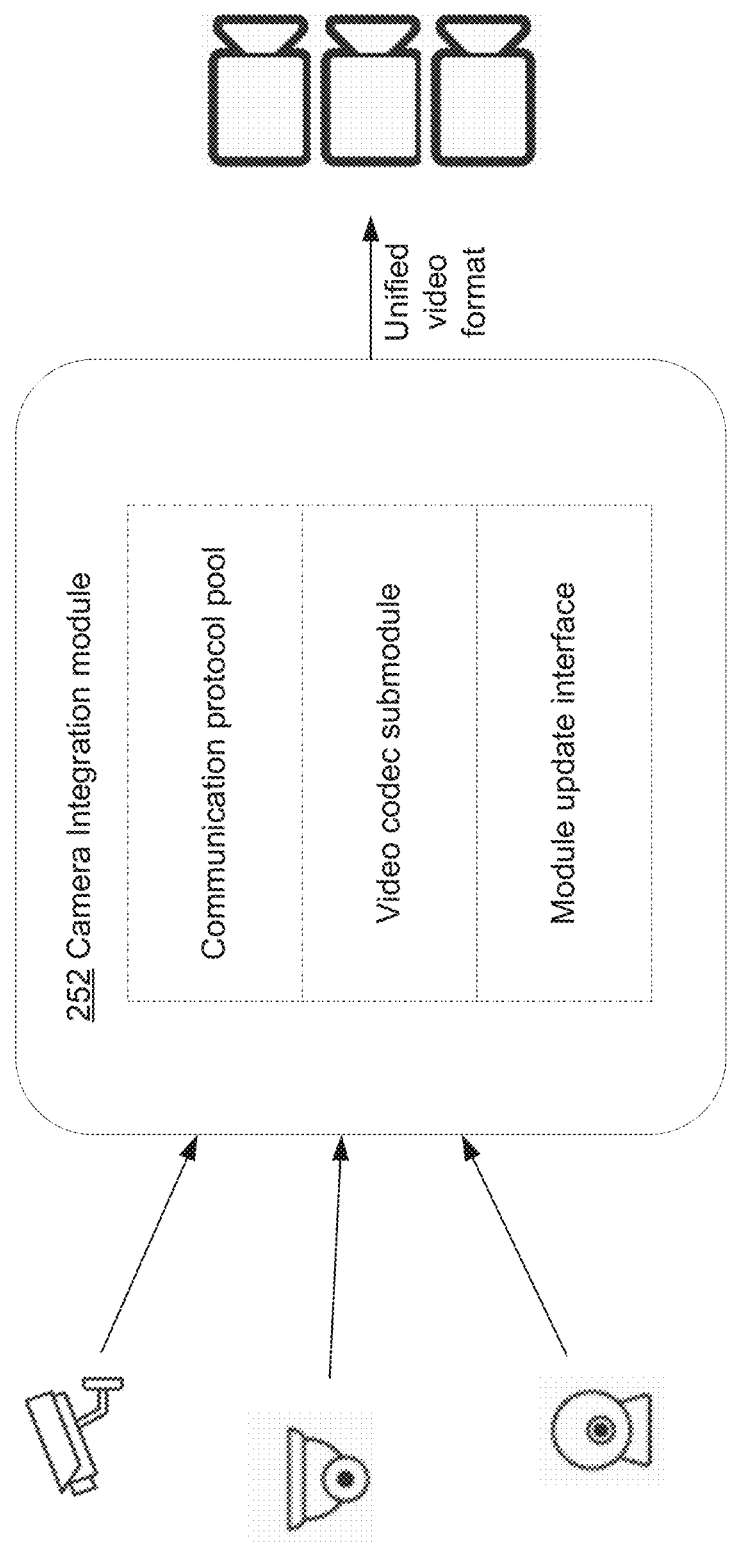
FIG. 4A illustrates an example diagram of a camera-integration module in the AI-powered cloud-native NVR device, in accordance with some embodiments.
Figure 4B:
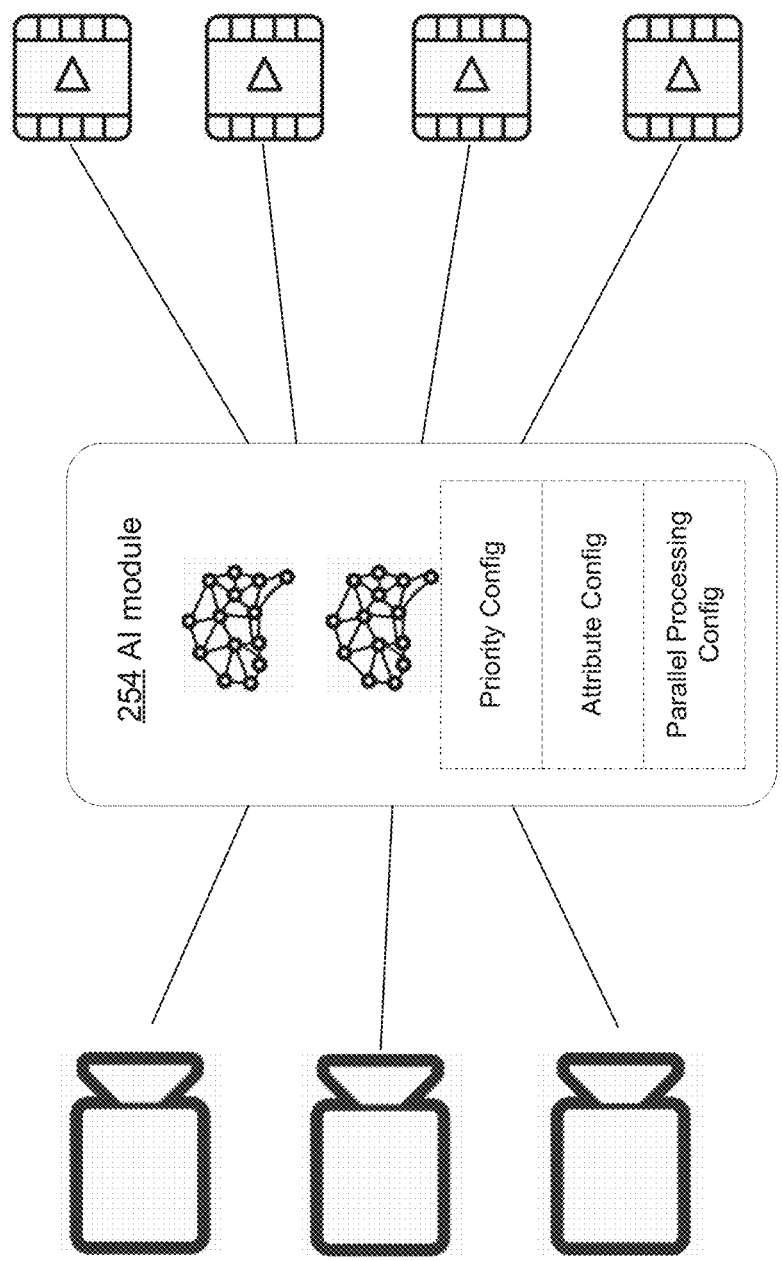
FIG. 4B illustrates an example diagram of an AI-module in the AI-powered cloud-native NVR device, in accordance with some embodiments.
Figure 4C:
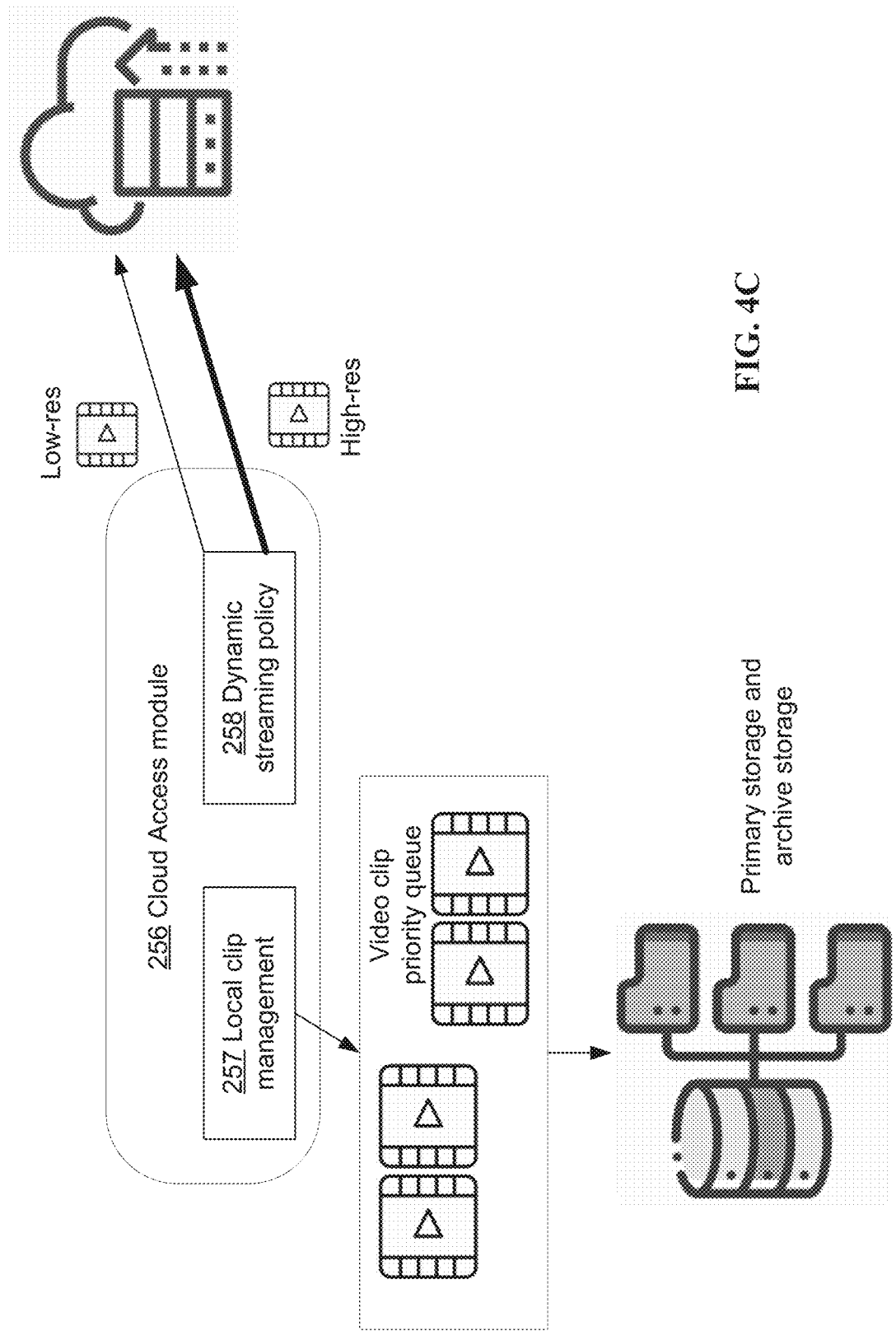
FIG. 4C illustrates an example diagram of a cloud-access module in the AI-powered cloud-native NVR device, in accordance with some embodiments.

In the following description, FIG. 3 illustrates an example diagram of the AI-powered cloud-native NVR device 200, in accordance with some embodiments. FIG. 4A illustrates an example diagram of a camera-integration module in the AI-powered cloud-compatible NVR device 200, in accordance with some embodiments. FIG. 4B illustrates an example diagram of an AI-module in the AI-powered cloud-native NVR device 200, in accordance with some embodiments. FIG. 4C illustrates an example diagram of a cloud-access module in the AI-powered cloud-native NVR device 200, in accordance with some embodiments. The AI-powered cloud-native NVR device 200 has similar appearance and comparable size as the traditional NVR device 132 in FIGS. 1A-1B, the camera-integration module, the AI-module, and the cloud-access module are implemented on the firmware of the NVR device 200.

As shown in FIG. 3, the example NVR 200 includes a plurality of Power over Ethernet (PoE) ports 210, one or more processors and memories 230, a local storage (HDD, SDD, NAS, etc.) 240, a firmware 250, and other hardware components such as a local area network (LAN) port, USB ports, video output ports (e.g., HDMI and/or VGA ports), Audio In/Out ports, etc. The NVR 200 features a user interface 259 that provides an interactive platform for users to configure the system according to their specific needs, using either an embedded or graphical user interface. The user interface 259 allows for a flexible and user-friendly experience in managing and customizing the surveillance system.

The array of Power over Ethernet (PoE) ports (210) serves as dedicated interfaces, facilitating the simultaneous delivery of electrical power and data communication through a singular Ethernet cable to IP cameras. In some embodiments, the NVR 200 may include 8, 16, 32, 64, 128, or 256 PoE ports. The processor and memory unit (230) are designed to process and execute the operations dictated by the firmware (250). The internal storage or Network Attached Storage (NAS) (240) is tasked with the local retention of data. Additionally, the operational logic set forth by the firmware (250) engages with both the local memory and storage (240) and the user interface (259).

In some embodiments, the firmware 250 may include various components, including a camera-integration module 252, an artificial intelligence (AI) module 254, a cloud-access module 256, and a firmware update interface 258.

The camera-integration module 252 is configured to connect a plurality of cameras (e.g., IP cameras) to the NVR 200 through the plurality of PoE ports 210 and receive video data collected by the plurality of cameras. The camera-integration module 252 is implemented as manufacturer agnostic, and the plurality of cameras may include a plurality of Internet Protocol (IP) cameras from different manufacturers using different communication standards, video compression formats, resolution and frame rates, security features, etc. For simplicity, the following description uses communication protocol to include all these aspects.

The AI module 254 is designed to analyze video streams captured by the connected cameras, facing the challenges of limited processing capacity and memory within the NVR 200. An example block diagram of the AI module 254 is depicted in FIG. 4B. Furthermore, the cloud-access module 256 aims to efficiently upload selected video clips to cloud storage, addressing the obstacles related to optimizing storage and bandwidth use during upload. FIG. 4C provides a block diagram of the cloud-access module 256's example configuration.

The firmware update interface 258 is configured to facilitate the updating of components such as the camera-integration module 252, the AI module 254, and the cloud-access module 256. This includes the integration of new communication protocols into the camera-integration module 252 via firmware updates, the deployment of new AI models, and the modification of AI model parameters within the AI module 254, all achieved through firmware updates.

The user interface 259 may further allow a user to customize the NVR as well as the modules inside of the NVR. For instance, the user interface 259 may allow a user to provide credentials for accessing the cloud storage, receive user instructions assigning different priorities to the video attributes defining the video clips of interest, etc.

In some embodiments, the user interface 259 is further designed to enable users to establish one or more workflows activated by specific events detected in the video streams. These workflows could encompass actions such as (1) initiating automatic recording upon recognizing an event of interest, (2) forwarding alerts, (3) controlling access barriers, or (4) playing a predetermined audio message. For instance, the workflow management module might interact with a building's access barrier, such as a door or gate. If the facial recognition analysis of a video feed confirms the approach of a recognized employee, the NVR 200 could issue a command to the access barrier, prompting it to open and allow entry.

FIG. 4A illustrates an example diagram of a camera-integration module 252 in the AI-powered cloud-compatible NVR device, in accordance with some embodiments. As shown, to ensure the Network Video Recorder (NVR) 200 is compatible with various manufacturers, a pool of communication protocols has been created. This pool contains communication protocols, each linked to a specific camera manufacturer. Upon connecting a camera from a particular manufacturer to the NVR 200, either directly via a PoE port or through a network switch, the NVR activates the relevant communication protocol associated with that manufacturer. This enables the NVR to communicate effectively with the camera, facilitating the reception of video data from the connected camera. For instance, the pool of communication protocols may include at least ONVIF (Open Network Video Interface Forum) or PSIA (Physical Security Interoperability Alliance). These protocols facilitate interoperability between devices from some of the major manufacturers.

In some cases, when a connected camera does not have corresponding communication protocol in the pool, the firmware 250 may throw an alert through the user interface 259, and/or allow an operator to update the firmware 250 through the firmware update interface 258 to add the communication protocol corresponding to the connected camera to the pool.

In addition, the camera-integration module 252 illustrated in FIG. 4A may further include a video codec submodule for transcoding the video data of different formats from the plurality of cameras into a standard video format. This submodule ensures the NVR 200 supports a wide range of video codec used across the different cameras, such as H.264, H.265, MJPEG, etc. Variations in codec implementations and settings (bit rate, frame rate, resolution) among manufacturers can affect compatibility and performance.

Furthermore, the camera-integration module 252 may further include a flexible configuration interface to adapt to the unique features and settings of different cameras from different manufacturers. For instance, different manufacturers might have proprietary APIs (Application Programming Interfaces) for communicating with their cameras, thus the firmware of the NVR 200 must be adaptable to handle these variances. Other features may include resolution adjustments, frame rate settings, motion detection parameters, etc. This flexible configuration interface allows users to fine-tune the camera-integration module 252, facilitating the incorporation of cameras from lesser-known brands or those with non-standard specifications.

Referring back to FIG. 3, the video data generated by the camera-integration module 252 is fed into the AI module 254 for processing. As mentioned above, NVR 200 usually has limited computational resources, which might not be sufficient to run complex AI models for real-time video analysis. To address these technical challenges, the AI module 254 may include a plurality of trained and pruned machine learning models for smaller memory footprint and faster inference. Here, pruning is a technique used to reduce the size of the trained machine learning model by removing parts of the model that contribute little to its predictive power. The pruned model is smaller than its unpruned version, which generally leads to faster inference times (i.e., fewer calculations for the model to perform).

In some embodiments, the AI models may be pre-trained using training data from the general domain, and subsequently fine-tuned using domain-specific training data. For instance, in an office building setup, the profiles of the employees may be used to fine-tune a general facial recognition model. After the fine-tuning, the AI model may go through a sparsification process to deactivate parts of the model. For AI models structured as neural networks or deep neural networks, this sparsification process involves setting the weights in certain layers to zero. To decide which weights to eliminate, the model might go through several cycles of sparse training. This involves making dynamic adjustments to the weights to assess their impact on the model's overall performance, as measured by the loss function. Weights that have little to no impact on performance are marked for removal. By pruning these weights, which are then not included in the final model and not used during the prediction phase, the model becomes leaner and faster, both in terms of storage and inference speed.

In addition to the weights-pruning approach described above, the AI module 254 may adopt a deep learning compression method to analyze and identify patterns in the pre-trained (over-parameterized) model, in order to encode it in a more compact form. For instance, a standalone deep learning model is trained to learn the structure and dynamics of the over-parameterized model, generating outputs indicating which neurons fire together, measuring the activeness of layers and/or portions of the layers during inferencing, the distribution of weights, another suitable attribute of the model, or any combination thereof. The standalone deep learning model may be trained using datasets that include both unpruned neural networks and their pruned counterparts. These pairs of neural networks, both before and after pruning, are adjusted to yield similar results.

In some embodiments, the AI module 254 may apply a matrix-based decomposition method to further enhance the compression rate of the AI models. In particular, the architecture of an AI model—whether it's the initially oversized model for a primary compression phase or the streamlined model produced through weight pruning or another deep learning-based compression technique—may be decomposed into smaller matrices. Here, the structure may include the weights and connections between neurons. For example, in a neural network, the filters at a particular layer are typically organized as a weight matrix. This matrix can be decomposed into several smaller matrices, including two orthogonal matrices that represent the left and right singular vectors, alongside a diagonal matrix that encapsulates the singular values of the original weight matrix. In certain cases, these smaller matrices are more straightforward to compress, often due to their sparse nature. Transforming a densely populated large weight matrix into multiple sparse matrices across one or more layers of the neural network can thus enhance the model's overall compression rate. Additionally, in other scenarios, the compression effectiveness can be further amplified not just by compressing these smaller matrices based on their inherent sparsity but also by selecting the top-K largest singular values along with their corresponding vectors to achieve a low-rank approximation of the initial matrix. The top-K selection may further reducing the size of the model to accommodate the deployment of the AI models on the NVR 200 with constrained resources.

Empirical data shows that utilizing the deep learning compression technique alongside the matrix-based decomposition method results in the AI models achieving a compression rate exceeding 95%, while maintaining satisfactory performance during inference. These highly compressed AI models deployed on the NVR 200 not only minimize their storage footprint, they also significantly accelerate the inferencing speed because there are less computation needs to be performed for each inferencing. This allows the NVR 200 to simultaneously process data streams from a plurality of cameras at a high frames per second speed. A prototype of the NVR 200 is able to perform object detection on video feeds from more than 16 IP cameras at more than 25 frames per second.

In surveillance context, the capability of the NVR 200 to concurrently process video data from multiple cameras enhances overall monitoring and the identification of potential threats. This combination of rapid processing and compatibility with multiple cameras makes the NVR 200 a valuable asset for video analytics tasks that demand immediate execution on affordable hardware.

FIG. 4B illustrates a block diagram of the AI module 254 showing example components. In some embodiments, the AI module 254 may be configured to identify video clips of interest, and upload only these video clips of interest to the cloud storage. This approach boosts the NVR system's efficiency and enhances its cost-effectiveness by ensuring that only video clips of interest are stored and shared in the cloud.

To achieve this, the AI module 254 may include a plurality of trained and pruned machine learning models to perform a wide range of tasks, and then allows the users to select a subset of the tasks to customize the AI module. For instance, the tasks may include motion detection, objection detection, objection recognition, facial recognition, license plate recognition, object attribute analytics, heat mapping, human activity recognition, etc. The user interface 259 (in FIG. 3) may provide options for the users to customize the AI module 254 (e.g., through the attribute config interface in FIG. 4B). Through this interface, users can tailor the AI module's focus by activating certain machine learning functionalities while deactivating others according to their specific needs. For example, in scenarios focused on monitoring traffic, the system might activate models specialized in detecting motion, recognizing car models, and identifying license plates. Conversely, within an office environment, the system could enable functionalities related to detecting motion, recognizing faces, and identifying human activities, aligning with the setting's unique requirements.

In some embodiments, multiple pruned AI models may be launched in parallel to maximize the computation efficiency (e.g., through the parallel processing config interface in FIG. 4B). For instance, if a user would like to capture the video clips with motions for facial recognition and human behavior recognition, the video first undergoes motion detection. Clips where motion is identified are then processed simultaneously by AI models for facial and behavioral recognition in a parallel manner. In some cases, motion detection might take place directly on the IP cameras (edge computing), offloading and distributing computation to these edge devices. If edge IP cameras are unable to perform motion detection, the video streams are then sent to the NVR for motion detection, and clips with detected motion are processed by subsequent AI models for further analysis.

In some embodiments, the NVR 200 may dynamically adjust the deployment of AI models (e.g., through the parallel processing config interface in FIG. 4B) to handle increases in motion detection by the IP cameras. For instance, the NVR 200 can learn the pattern of its environment. During periods of high activity (such as rush hours for traffic systems, or drop-off and pick-up times for school monitoring), additional instances of AI models may be activated to handle the influx of video clips with detected motion. For instance, the facial recognition model may be duplicated for simultaneously performing facial recognition on multiple incoming video feeds. The NVR 200 may provide options through the user interface 259 (in FIG. 3) for the user to configure the level of parallel processing, such as determining the number of instances for a particular AI model to activate during high-traffic periods.

FIG. 4C illustrates a block diagram of the cloud-access module 256, in accordance with some embodiments. The components in FIG. 4C are for illustration purposes only. Depending on the implementation, the cloud-access module 256 may include fewer, more, or alternative components.

In some embodiments, as one of the basic optimizations, the cloud-access module 256 may include a video compression sub-module to compress the video clips before uploading to the cloud storage. The user may configure the resolution of the video (thus the compression ratio) for uploading. The cloud-access module 256 may further include encrypting the to-be-uploaded video clips for security purposes.

In some embodiments, the cloud-access module 256 may include a local clip management sub-submodule 257 to manage the to-be-uploaded video clips in various ways. For instance, the cloud-access module 256 may maintain a local video staging area (e.g., a memory space or a portion of the local storage) for temporarily storing the video clips of interest before uploading to the cloud storage. The local video staging area may include a video clip priority queue, and the to-be-uploaded video clips may be arranged according to the different priorities assigned to the video attributes associated with the buffered video clips of interest. For instance, a user may assign a higher priority to video clips with unrecognized faces than video clips with recognized faces. The video clips with the higher priority may be uploaded to the cloud first. The user may perform such priority configuration through a priority config user interface associated with the AI module 254.

In some embodiments, the cloud-access module 256 may implement a dynamic streaming policy 258 to mitigate bandwidth congestion to the cloud storage. For instance, a low-resolution version of the video clips may be uploaded to the cloud storage instantly after the video clips are ready (e.g., after compression and/or encryption). This step allows the users to have immediate cloud access to these videos. Subsequently, a higher-resolution version of the video clips may be uploaded at a different time point to the cloud storage to replace the corresponding lower-resolution videos. The higher-resolution the video clips consumes more network bandwidth, so the upload of these videos may be scheduled to avoid the high-traffic period. For instance, during the peak times of activities (e.g., rush hours), the lower-resolution version of the video clips are uploaded for immediate cloud storage and access while minimizing bandwidth consumption. After the busy period, the higher resolution version of the video clips may be uploaded, thereby enhancing the quality of the videos available in the cloud.

In some embodiments, the NVR 200 could also be equipped with both primary and archive storage solutions. The primary storage, which could be a Hard Disk Drive (HDD), Solid State Drive (SSD), Network Attached Storage (NAS), etc., serves as the initial location for storing video data. Video data exceeding a specific age and/or those already transferred to the cloud are slated for migration to the archive storage. Before this transfer, the selected video data undergoes compression to create a significantly reduced version for efficient storage in the archive system.

FIG. 5 illustrates an example method 500 performed by an AI-powered Cloud-Native NVR, in accordance with some embodiments.

As shown in FIG. 5, method 500 may include connecting to a plurality of cameras through a plurality of Power over Ethernet (PoE) ports of the NVR (block 510). For example, the NVR may connect to a plurality of cameras through a plurality of power over ethernet (PoE) ports of the NVR, as described above.

As also shown in FIG. 5, process 500 may include receiving video data from the plurality of cameras (block 520). For example, the NVR may simultaneously receive video data from the plurality of cameras, as described above.

As further shown in FIG. 5, process 500 may include feeding the received video data into a plurality of pruned machine learning models to identify video clips of interest, where each of the plurality of pruned machine learning models is pruned by decomposing a structure of the machine learning model into a plurality of matrices and compressing the plurality of matrices (block 530). For example, the NVR may feed the received video data into a plurality of pruned machine learning models to identify video clips of interest, where the plurality of pruned machine learning models are pruned by decomposing a structure of the machine learning models into a plurality of matrices and compressing the plurality of matrices, as described above.

As also shown in FIG. 5, process 500 may include uploading the video clips of interest to a cloud server for storage and sharing, where the uploading may include: uploading, at a first time point, a lower-resolution version of the video clips of interest to the cloud server for immediate cloud access, and uploading, at a second time point later than the first time point, a higher-resolution version of the video clips of interest to the cloud server to replace the lower-resolution version of the video clips of interest (block 540). For example, the NVR may upload the video clips of interest to a cloud server for storage and sharing, where the uploading may include: uploading, at a first time point, a lower-resolution version of the video clips of interest to the cloud server for immediate cloud access, and uploading, at a second time point later than the first time point, a higher-resolution version of the video clips of interest to the cloud server to replace the lower-resolution version of the video clips of interest, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
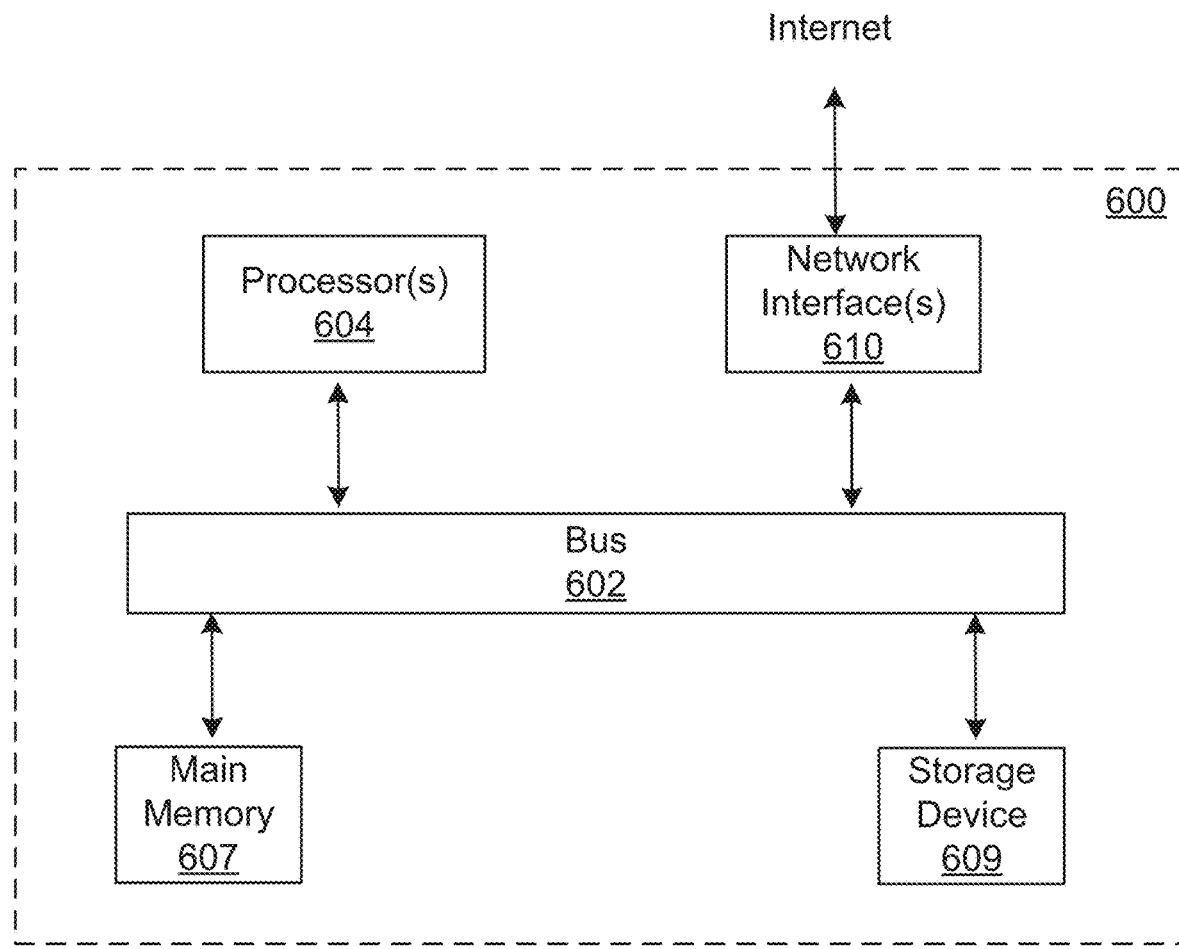
FIG. 6 illustrates an example computer system in which any of the embodiments described herein may be implemented.

FIG. 6 illustrates an example computer system in which any of the embodiments described herein may be implemented. The computing device may be used to implement one or more components of the systems and the methods shown in FIGS. 1-4C. The computing device 600 may comprise a bus 602 or other communication mechanisms for communicating information and one or more hardware processors 604 coupled with bus 602 for processing information. Hardware processor(s) 604 may be, for example, one or more general-purpose microprocessors.

The computing device 600 may also include a main memory 607, such as random-access memory (RAM), cache and/or other dynamic storage devices, coupled to bus 602 for storing information and instructions to be executed by processor(s) 604. Main memory 607 may also be used for storing temporary variables or other intermediate information during the execution of instructions to be executed by processor(s) 604. Such instructions, when stored in storage media accessible to processor(s) 604, may render computing device 600 into a special-purpose machine that is customized to perform the operations specified in the instructions. Main memory 607 may include non-volatile media and/or volatile media. Non-volatile media may include, for example, optical or magnetic disks. Volatile media may include dynamic memory. Common forms of media may include, for example, a floppy disk, a flexible disk, a hard disk, a solid-state drive, a magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, or networked versions of the same.

The computing device 600 may implement the techniques described herein using customized hard-wired logic, one or more ASICs or FPGAs, firmware and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 607. Such instructions may be read into main memory 607 from another storage medium, such as storage device 609. Execution of the sequences of instructions contained in main memory 607 may cause processor(s) 604 to perform the process steps described herein. For example, the processes/methods disclosed herein may be implemented by computer program instructions stored in main memory 607. When these instructions are executed by processor(s) 604, they may perform the steps as shown in corresponding figures and described above. In alternative embodiments, hard-wired circuitry may be used in place of or in combination with software instructions.

The computing device 600 also includes a communication interface 610 coupled to bus 602. Communication interface 610 may provide a two-way data communication coupling to one or more network links that are connected to one or more networks. As another example, communication interface 610 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be composed in program codes or instructions stored in a memory (e.g., a non-transitory computer-readable storage medium described above). Such an algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A Network Video Recorder (NVR) apparatus, comprising:
    a plurality of Power over Ethernet (PoE) ports;
    one or more processors and one or more non-transitory computer-readable memories coupled with the one or more processors; and
    a camera-integration module, an Artificial Intelligence (AI) module, and a cloud-access module deployed in the one or more non-transitory computer-readable memories and executable by the one or more processors, wherein:
    the camera-integration module is configured to connect a plurality of cameras to the NVR through the plurality of PoE ports and receive video data collected by the plurality of cameras,
    wherein the camera-integration module is manufacturer-agnostic and comprises a pool of communication protocols respectively corresponding to a plurality of camera manufacturers,
    the camera-integration module is further configured to activate, from the pool of communication protocols, a communication protocol corresponding to a camera manufacturer for connecting to a camera from the camera manufacturer, and
    in response to a camera missing a corresponding communication protocol in the pool of communication protocols, prompting an alert to an operator to update a firmware of the NVR;
    the AI module is configured to process the video data and generate video clips of interest; and
    the cloud-access module is configured to:
    store the video clips of interest in a local video staging storage, wherein a first subset of the video clips with faces unrecognized by the AI module are assigned with a higher priority than a second subset of video clips with faces recognized by the AI module, and
    upload the first subset of video clips to a cloud storage before uploading the second subset of video clips.

2. The NVR apparatus of claim 1, wherein the camera-integration module comprises:
    a video codec sub-module for transcoding the video data of different formats from the plurality of cameras into a standard video format.

3. The NVR apparatus of claim 1, wherein the AI module comprises:
    one or more trained and pruned machine learning models configured to perform one or more of the following operations:
    motion detection;
    objection detection;
    objection recognition;
    facial recognition;
    license plate recognition;
    object attribute analytics;
    heat mapping; or
    human activity recognition.

4. The NVR apparatus of claim 1, wherein the AI module is configured to perform object detection on video feeds from more than ten IP cameras at more than twenty frames per second.

5. The NVR apparatus of claim 1, further comprising:
    a graphic user interface configured for a user to select video attributes defining the video clips of interest, wherein:
    the AI module is further configured to detect video clips satisfying the selected video attributes.

6. The NVR apparatus of claim 5, wherein the graphic user interface is further configured for the user to select one or more workflows that are triggered when an event of interest when detected in the video data.

7. The NVR apparatus of claim 6, wherein the one or more workflows comprise one or more of (1) automatic recording in response to the event of interest when detected, (2) alert forwarding, (3) operating an access barrier, or (4) playing a preconfigured audio.

8. The NVR apparatus of claim 5, wherein the graphic user interface is further configured to:
    receive user credentials for accessing the cloud storage.

9. The NVR apparatus of claim 5, wherein the graphic user interface is further configured to:
    receive user instructions assigning different priorities to the video attributes defining the video clips of interest.

10. The NVR apparatus of claim 1, wherein the cloud-access module comprises:
   a video compression sub-module for compressing the video clips of interest before uploading the video clips.

11. The NVR apparatus of claim 1, wherein the cloud-access module comprises:
   an encryption sub-module configured to encrypt the video clips of interest before uploading to the cloud storage.

12. The NVR apparatus of claim 1, wherein the cloud-access module is further configured to upload a video clip of interest using a dynamic streaming policy to mitigate bandwidth congestion, characterized by:
   uploading, at a first time point, a lower-resolution version of the video clip of interest to the cloud storage for immediate cloud access, and
   uploading, at a second time point scheduled later than the first time point, a higher-resolution version of the video clip of interest to the cloud storage to replace the lower-resolution version of the video clip of interest.

13. The NVR apparatus of claim 1, wherein the cloud storage allows a first user to share a video clip with a second user.

14. The NVR apparatus of claim 1, further comprising:
   a primary local storage configured to store the video data, and
   an archive storage configured to store highly compressed video data,
   wherein the video data older than a preset duration in the primary local storage is compressed and migrated to the archive storage.

15. The NVR apparatus of claim 1, wherein the plurality of cameras are directly powered through the plurality of PoE ports.

16. The NVR apparatus of claim 1, wherein the video data comprise a plurality of video feeds collected by the plurality of cameras, and the AI module is further configured to:
   for each of the plurality of video feeds, inputting the video feed into a plurality of trained and pruned machine learning models in parallel for generating the video clips of interest.

17. A computer-implemented method implemented by a Network Video Recorder (NVR), comprising:
   connecting to a plurality of cameras through a plurality of PoE ports of the NVR using a pool of communication protocols;
   in response to a camera missing a corresponding communication protocol in the pool of communication protocols, prompting an alert to an operator to update a firmware of the NVR;
   receiving video data from the plurality of cameras connected to the NVR;
   feeding the received video data into a plurality of machine learning models to identify video clips of interest;
   storing the video clips of interest in a local video staging storage, wherein a first subset of video clips with faces unrecognized by the plurality of machine learning models are assigned with a higher priority than a second subset of video clips with faces recognized by the plurality of machine learning models; and
   uploading the video clips of interest to a cloud server for storage and sharing, wherein the first subset of video clips are uploaded before uploading the second subset of video clips, and the uploading comprises:
      uploading, at a first time point, a lower-resolution version of the video clips of interest to the cloud server for immediate cloud access,
      uploading, at a second time point scheduled later than the first time point, a higher-resolution version of the video clips of interest to the cloud server to replace the lower-resolution version of the video clips of interest.

* * * * *